US008638018B2

(12) United States Patent
Dietl

(10) Patent No.: US 8,638,018 B2
(45) Date of Patent: Jan. 28, 2014

(54) SERIES MOTOR WITH PERMANENT MAGNET

(75) Inventor: Lothar Dietl, Aalen (DE)

(73) Assignee: C. & E. Fein GmbH (DE)

( * ) Notice: Subject to any disclaimer, the term of this patent is extended or adjusted under 35 U.S.C. 154(b) by 0 days.

(21) Appl. No.: 13/356,028

(22) Filed: Jan. 23, 2012

(65) Prior Publication Data

US 2012/0119600 A1 May 17, 2012

Related U.S. Application Data

(63) Continuation of application No. PCT/EP2010/060742, filed on Jul. 23, 2010.

(30) Foreign Application Priority Data

Jul. 31, 2009 (DE) .......................... 10 2009 037 114

(51) Int. Cl.
*H02K 1/00* (2006.01)
(52) U.S. Cl.
USPC ........................................ 310/181
(58) Field of Classification Search
USPC ......................... 310/179, 180, 181
See application file for complete search history.

(56) References Cited

U.S. PATENT DOCUMENTS

| | | |
|---|---|---|
| 3,201,625 A | 8/1965 | Smith et al. |
| 4,181,875 A | 1/1980 | Kohzai et al. |
| 5,444,318 A * | 8/1995 | Stumpf ............................ 310/77 |
| 6,204,587 B1 | 3/2001 | Torok et al. |

FOREIGN PATENT DOCUMENTS

| | | |
|---|---|---|
| DE | 1181309 B | 11/1964 |
| DE | 2305146 A1 | 8/1974 |
| DE | 109775 A5 | 11/1974 |
| DE | 2749820 A1 | 5/1978 |
| DE | 145590 A1 | 12/1980 |
| DE | 3729680 A1 | 3/1989 |
| EP | 0266672 A2 | 5/1988 |
| EP | 0582416 A1 | 2/1994 |
| EP | 0615331 A1 | 9/1994 |
| EP | 0673105 A2 | 9/1995 |
| EP | 1363384 A2 | 11/2003 |
| GB | 2241119 A | 8/1991 |

OTHER PUBLICATIONS

German Search Report; Application No. DE 10 2009 037 114.1; Issued: Mar. 18, 2010; 4 pages.
International Search Report and Written Opinion of the International Searching Authority; Application No. PCT/EP2010/060742; Issued: Oct. 20, 2010; Mailing Date: Oct. 26, 2010; 10 pages.
International Preliminary Report on Patentability and Translation of the Written Opinion of the International Searching Authority; Application No. PCT/EP2010/060742; Issued: Feb. 7, 2012; 10 pages.

* cited by examiner

*Primary Examiner* — Nguyen N Hanh
(74) *Attorney, Agent, or Firm* — St. Onge Steward Johnston & Reens LLC

(57) ABSTRACT

A series-wound DC motor is disclosed comprising a stator having at least two poles and an armature, each pole comprising at least one field winding which is connected in series with an armature winding, and further comprising at least one permanent magnet arranged on each pole, whose magnetic field is superimposed on the main field produced by the at least one field winding.

20 Claims, 3 Drawing Sheets

SERIES MOTOR WITH PERMANENT MAGNET

CROSSREFERENCES TO RELATED APPLICATIONS

This application is a continuation of International Patent Application PCT/EP2010/060742, filed on Jul. 23, 2010 designating the U.S., which International Patent Application was published in German language and claims priority from German patent application 10 2009 037 114.1, filed on Jul. 31, 2009. The entire contents of these priority applications are incorporated herein by reference.

BACKGROUND OF THE INVENTION

The invention relates to a series-wound motor having a stator and an armature, having at least one field winding which is connected in series with an armature winding, and having at least one permanent magnet, whose magnetic field is superimposed on the main field produced by the at least one field winding.

In principle, it is known in the prior art (cf. DD 109 775, DD 145 590, DE-PS1 181 309, EP 0 582 416 B1) to provide an auxiliary series winding for direct-current motors with permanent-magnet excitation, in order to prevent the motor from being demagnetized by the armature reaction.

Furthermore, DE 37 29 680 A1 discloses a series-wound permanent-magnet motor which has interpoles with two-part interpole compensation windings for each interpole, with the aim of improving the efficiency of the interpoles in this way, and of preventing the permanent magnets from being demagnetized by the armature reaction.

Furthermore, EP 0 615 331 A1 discloses a series-wound motor in the form of a universal motor having a braking device, in which self-excited braking is intended to be initiated reliably by the use of a permanent magnet. In this case, during motor operation, an operating field is produced via the field windings and, together with an armature field which is formed, results in a resulting field as required for motor operation. When switching to braking operation, the motor is disconnected from the power supply system, and the field windings are short-circuited via the armature. In order to ensure reliable initiation of braking by self-excitation, a permanent magnet is additionally arranged in a slot on the pole shoe laminated core, to be precise such that a magnetic field acts in the same direction as the lines of force of the electrically excited main flux. The strength of the permanent magnet is designed such that its field is at least twice as great as the field resulting from the remanent induction in the iron of the pole shoe laminated core. This means that, even in the situation in which the remanent induction at the switching time from motor operation to generator operation acts against the field of the permanent magnet, there is sufficient excess permanent magnetic field in order to reliably initiate self-excitation. In order to prevent the permanent magnet from being demagnetized when the motor is started, either a starting resistor is provided or a diode, thus allowing the starting current initially to flow only in one direction, until the diode is bridged after a certain switch-on delay, such that the motor is then supplied with current directly from the AC power supply system.

Series-wound motors are used in particular in the form of universal motors for numerous applications, in particular in electrical tools. However, series-wound motors have the disadvantage that the (unregulated) no-load rotation speed is considerably higher than the (unregulated) rated rotation speed when operated on load. This means that the rotation-speed/torque characteristic is relatively steep and that the rotation speed is therefore relatively highly dependent on the torque. This means that the use of series-wound motors is problematic in those applications in which the (unregulated) no-load rotation speed must be limited, for example for safety reasons.

SUMMARY OF THE INVENTION

In view of this it is a first object of the invention to disclose a series-wound motor which, in comparison to conventional series-wound motors, has an improved rotation-speed/torque characteristic.

It is a second object of the invention to disclose a series-wound motor in which, in particular, the (unregulated) no-load rotation speed can be limited to a non-critical value.

These and other objects are addressed by a series-wound motor having a stator and an armature, having at least one field winding which is connected in series with an armature winding, and having at least one permanent magnet, whose magnetic field is superimposed on the main field produced by the at least one field winding, with the motor being permanently fed during operation from a DC voltage source or from an AC voltage source via a rectifier.

The permanent superimposition of the main field produced by the at least one field winding on a permanent-magnet field reinforces the excitation field in particular when the electrical excitation is weak on no-load, thus leading to a reduction in the no-load rotation speed. When the motor is loaded, the electrical excitation then becomes greater, while the excitation produced by the permanent magnet remains the same. The rated rotation speed will therefore decrease less severely than the no-load rotation speed. This results in a flatter rotation-speed/torque characteristic, that is to say the rotation speed is less severely dependent on the torque.

In one preferred refinement of the invention, the at least one permanent magnet is held in a slot in a pole shoe.

This ensures simple assembly and secure attachment.

In one alternative embodiment, the at least one permanent magnet is held on the inner surface of a pole shoe. This is preferably a very flat embodiment (approximately 0.3 to 2 mm), with attachment preferably by adhesive bonding.

In both cases, the permanent magnet preferably has a sufficiently high field strength that field weakening, which is caused by the arrangement of the permanent magnet, is at least compensated for.

The fitting of a slot on a pole shoe acts like an air gap and first of all leads to field weakening. This field weakening can be compensated for, or even overcompensated for, by the superimposed field of the permanent magnet, provided that this has a sufficiently high field strength.

For this purpose, the permanent magnet is preferably composed of a rare-earth material. Permanent magnets such as these are composed, for example, of a cobalt-samarium material or of neodymium-iron-boron materials. They have high remanent induction and a high coercivity field strength, and have a very high specific magnetic energy. Permanent magnets such as these composed of a rare-earth material are particularly suitable for use for the invention since they even make it possible to overcompensate for field weakening caused by the slot.

According to a further embodiment of the invention, the stator has at least two pole shoes, on each of which at least one slot is provided, in which a permanent magnet is held.

At least two permanent magnets can be provided in this case and are arranged symmetrically on the pole shoes.

An arrangement such as this is advantageous when the motor is intended to be designed for rotation-direction reversal.

If, in contrast, the motor has a preferred rotation direction, then, according to a further refinement of the invention, the permanent magnets are preferably arranged asymmetrically on the pole shoes.

The asymmetric arrangement results in improved commutation.

According to a further refinement of the invention, the at least one permanent magnet can be inserted into the slot in the axial direction.

This makes it possible to simplify assembly. At the same time, inter-locking fixing can be achieved in this case by suitable adaptation of the shape of the slot and the shape of the permanent magnet, for example in the form of a dovetail guide.

According to a further refinement of the invention, the at least one permanent magnet extends over the entire axial length of an associated pole shoe.

Alternatively, the at least one permanent magnet may also extend only over a part of the axial length of an associated pole shoe.

In order to permanently ensure physical superimposition of the magnetic fields of the field winding and permanent magnet, the permanent magnet must be aligned to correspond to the direction of the main field. For this purpose, when connected to the AC power supply system, it is necessary to convert the AC voltage to a rectified (and possibly smoothed) AC voltage via a rectifier, preferably a bridge rectifier, via which the field coil or coils and the armature are supplied with current. Alternatively, it is, of course, also possible to operate directly with DC voltage. The correct polarity can be ensured in all cases by means of a diode, in order to ensure physical superimposition of the main field and the permanent-magnet field.

According to a further refinement of the invention, the polarity of the field windings is switchable.

This makes it possible to destructively superimpose the field winding and the permanent magnet, thus resulting in field weakening. This leads to a particularly high rotation speed, which may be advantageous for special applications.

According to a further refinement of the invention, the current direction through the armature is reversible.

This makes it possible to reverse the rotation direction of the motor without permanently field-reinforcing superimposition of the magnetic fields of the permanent magnet and field coil being adversely affected.

The invention furthermore specifies an electrical tool having a series-wound motor, in which the series-wound motor is designed to ensure that the no-load rotation speed is limited to a maximum permissible value.

This is particularly advantageous for those applications in which the (unregulated) no-load rotation speed must be limited. This makes it possible to at least partially compensate for the design-dependent disadvantages of universal motors, which lead to a high no-load rotation speed in comparison to the rotation speed on load.

According to one development of this embodiment, a flat in the rotation-speed/torque characteristic, which is caused by the at least one permanent magnet, in comparison to the series-wound motor without a permanent magnet is used by adaptation of the windings to form a peak in the torque in the working range, while at the same time reducing the no-load rotation speed to a permissible value.

In comparison to the same motor without permanent magnets, the modified motor winding results in a higher rated rotation speed with the same torque. This allows a higher gearbox step-down ratio, thus resulting in a greater torque. Alternatively, a greater torque can be achieved at the same rotation speed.

In contrast, if the winding is not modified, the rated rotation speed is substantially maintained, thus reducing the no-load rotation speed in comparison to the same motor without permanent magnets. This allows the no-load rotation speed to be limited to a maximum permissible value. This is particularly important when the electrical tool is in the form of an angle grinder since, if the motor electronics fail, it is necessary to ensure that the angle grinder does not run too quickly on no load. The circumferential velocity of the grinding disk must be limited to a maximum of 80 m/s in an angle grinder, in order to safely prevent the grinding disk from breaking up.

The improved rotation-speed/torque characteristic according to the invention can thus be used particularly advantageously for angle grinders.

It is self-evident that the features mentioned above and those which are still to be explained in the following text can be used not only in the respectively stated combination but also in other combinations or on their own, without departing from the scope of the present invention.

BRIEF DESCRIPTION OF THE DRAWINGS

Further features and advantages of the invention will become evident from the following description of preferred exemplary embodiments, and with reference to the drawing, in which.

DESCRIPTION OF PREFERRED EMBODIMENTS

Figure 1:
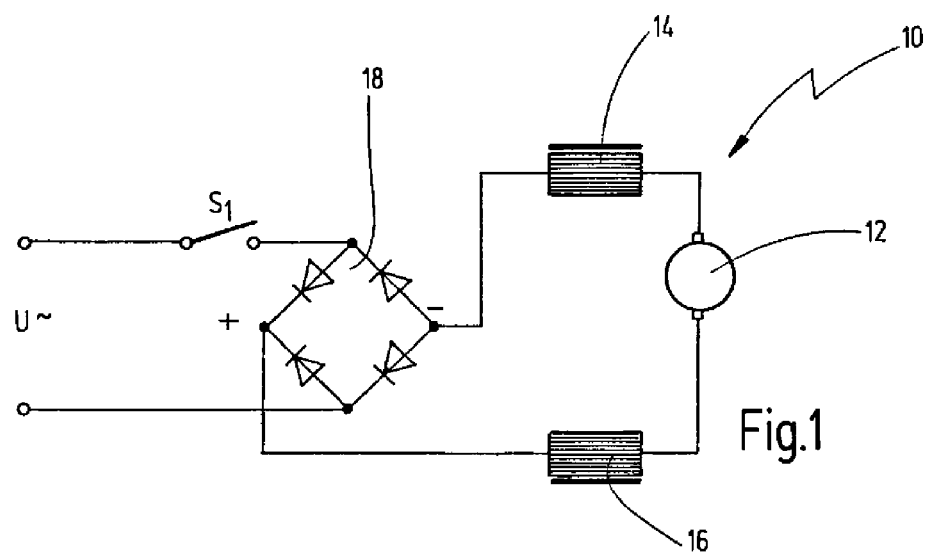
FIG. 1 shows a circuit diagram of a first embodiment of a series-wound motor according to the invention.

FIG. 1 shows a circuit of a series-wound motor according to the invention, which is annotated 10 overall.

The series-wound motor 10 has an armature 12 with an armature winding which is connected in series with two field windings 14, 16. The motor is supplied with alternating current from an AC voltage source U~ (for example 230 V, 50 Hz). A motor switch S1 is used for switching on and off. The AC voltage is rectified via a rectifier 18 in the form of a bridge rectifier, thus resulting in this being supplied as a pulsating DC voltage. Furthermore, the bridge rectifier may have means for smoothing (for example a capacitor, not illustrated). In addition to the two field windings 14, 16 which produce the main excitation, the series-wound motor 10 has permanent magnets, which are each introduced into a flat slot in a pole shoe.

Various possible arrangements of the permanent magnets on the stator 26 will be explained briefly in the following text with reference to FIGS. 4 to 6.

Figure 4:
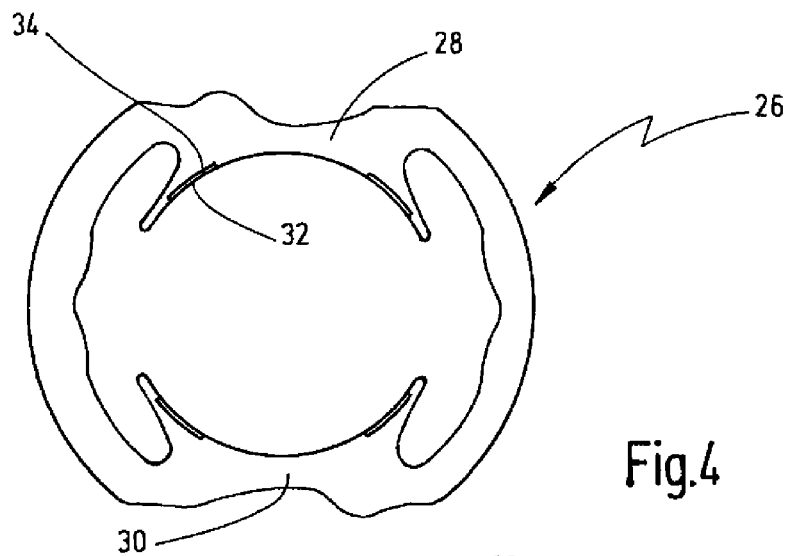
FIG. 4 shows a first embodiment of a stator according to the invention, in each case having two permanent magnets on each pole shoe, which are held arranged symmetrically in slots in the pole shoe.
Figure 5:
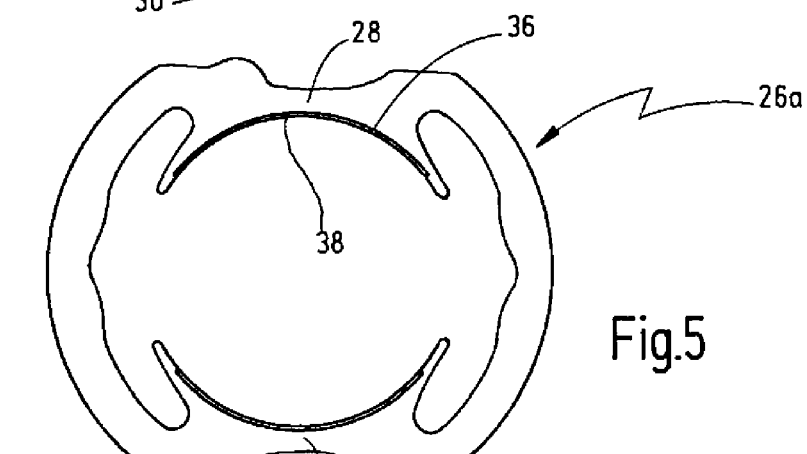
FIG. 5 shows a modified embodiment of the stator shown in FIG. 4, with in each case one permanent magnet, which extends over a greater area of the pole shoe in the circumferential direction, arranged symmetrically.
Figure 6:
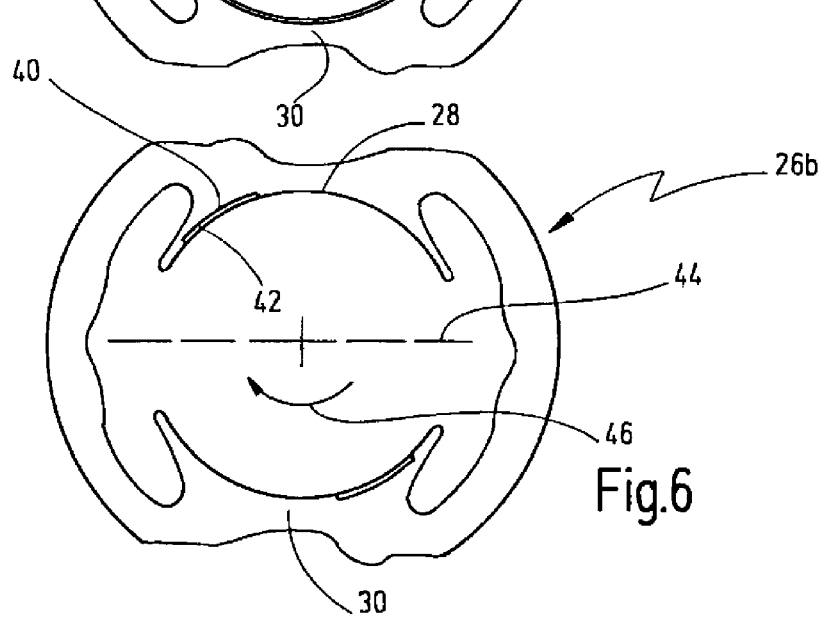
FIG. 6 shows a further embodiment of a stator according to the invention having two asymmetrically arranged permanent magnets, which are shifted with respect to a central arrangement in the direction of the inclined edge of the two pole shoes.

FIGS. 4-6 illustrate a cross-sectional view of the stator 26. For clarity reasons, the field windings and the armature have not been shown. The stator 26 has two pole shoes 28, 30. Two flat slots 32, each of which holds a permanent magnet 34, are provided in the vicinity of the pole shoe end arranged symmetrically when seen in the circumferential direction, on each pole shoe 28. 30. The respective slot 32 has only a shallow depth of, for example, 0.3 to 1 mm, and can preferably be designed such that this results in the respective permanent magnet 34 being fixed in an interlocking manner on the associated slot 32. Seen in the radial direction, the slot 32 opens on the inner surface of the pole shoe. The respective slot 32 extends over the entire axial length of the stator 26, thus allowing the permanent magnet 34 to be inserted from an axial end into the slot 32, and thus allowing it to be fitted easily. The total of four permanent magnets 34 are arranged symmetrically, as a result of which the relevant series-wound motor 10 is suitable for rotation-direction reversal. Alternatively, the permanent magnets 34 could each extend only over a part of the axial length of the respective pole shoes 28, 30.

FIG. 5 shows a modification of the stator, which is annotated overall 26a here. In a modification of the embodiment shown in FIG. 4, only one central slot 36 is provided on each pole shoe 28, 30, and extends over the majority of the pole shoe 28 or 30, seen in the circumferential direction of the respective pole shoe 28, 30. An appropriately shaped permanent magnet 38 is held in this slot 36. A slot of the same size and arrangement is provided with a corresponding permanent magnet as well on the opposite pole shoe 30, thus once again resulting in a symmetrical arrangement overall.

A further modification of the stator is illustrated in FIG. 6, and is annotated 26b overall. In this case, the permanent magnets 42 are arranged asymmetrically, which is advantageous for a motor having a preferred direction, since this allows better commutation to be achieved. A slot 40 with an associated permanent magnet 42 is provided on each pole shoe 28, 30, but in this case the permanent magnets 40 are moved away from the neutral zone 44, in the opposite direction to the rotation direction of the armature 12. In FIG. 6, the rotation direction of the series-wound motor is annotated 46.

The arrangement of permanent magnets directly in a slot, in each case directly under the pole shoe, first of all results in an additional air gap, which leads to field weakening of the main field produced by the field windings 14, 16. Since the permanent magnets are composed of a rare-earth magnetic material, they have a very high field strength, high remanent induction and a high coercivity field strength. The field weakening which is caused by the slot can therefore be more than compensated for, thus resulting in a reinforced total field overall, when the magnetic fields of the permanent magnets 34, 38, 42 and the main field produced by the field windings 14, 16 are physically superimposed. In this case, the current direction through the field windings 14, 16 is chosen such that the fields of the permanent magnets 34, 38, 42 and the main field have the same polarity.

The effect of the use of the permanent magnets will be explained in the following text with reference to FIG. 3.

Figure 3:
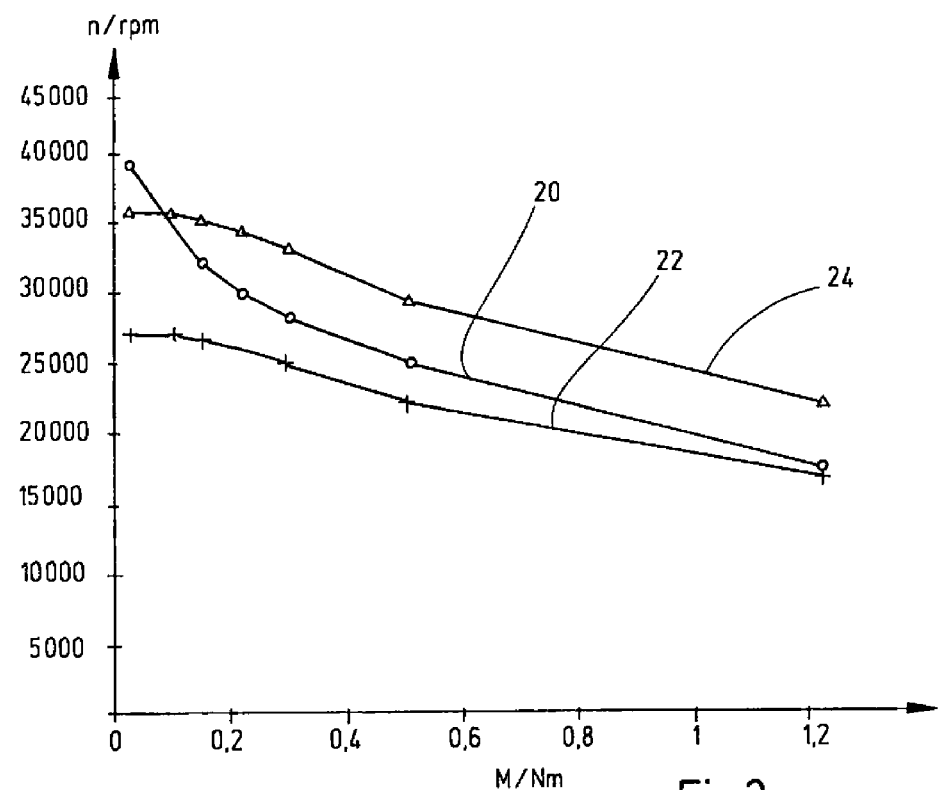
FIG. 3 shows the comparison of different rotation-speed/torque characteristics of a conventional series-wound motor with two series-wound motors according to the invention of different design.

The curve 20 in FIG. 3 shows the rotation-speed/torque characteristic of a conventional universal motor (rating 1200 W for the WSG 14 angle grinder marketed by the applicant), without the use of permanent magnets. In the case of the conventional motor as shown by the curve 20, the rotation speed n (shown in revolutions per minute) is relatively strongly dependent on the torque M (shown in Nm). On no-load, the rotation speed is virtually 40 000 rpm, while the rotation speed when loaded with 1.2 Nm falls to about 17 500 rpm.

The curve 22 shows the effect of using in each case two permanent magnets 34 arranged symmetrically as shown in FIG. 4. This results in a considerably flatter rotation-speed/torque characteristic as shown by the curve 22. In particular, the no-load rotation speed falls considerably, to a value of about 27 000 rpm, while the rotation speed on load remains virtually constant, at 1.2 Nm. In this case, the rating is approximately 1100 W.

The curve 24 shows how the motor, which is otherwise designed to be the same, can advantageously be adapted by means of a modified winding characteristic. The rotation-speed level can be raised again overall such that the no-load rotation speed assumes a higher value which, however, may still be below the no-load rotation speed of the motor without permanent magnets and, for example, is about 36 000 rpm. At the same time, the rotation speed rises with the torque otherwise being the same, thus resulting in an upward shift, with the rotation-speed/torque curve profile being flatter overall. For the motor otherwise of the same design, the rating rises to about 1400 W.

Figure 7:
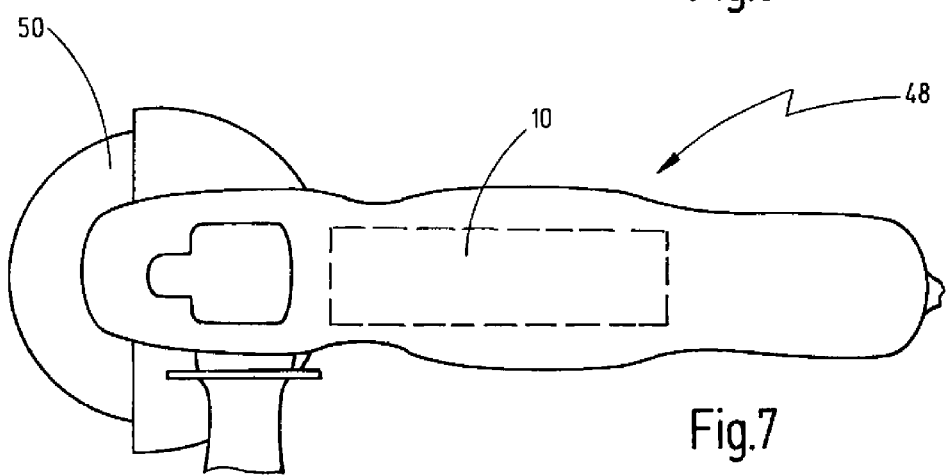
FIG. 7 shows a schematic illustration of an electrical tool in the form of an angle grinder with a series-wound motor according to the invention.

Therefore, in this embodiment, a greater gearbox step-down ratio can be used when the motor is used, for example, in an electrical tool 44 as shown in FIG. 7.

FIG. 7 shows a schematic illustration from above of an electrical tool 48 in the form of an angle grinder. The electrical tool 48 has a series-wound motor 10 as shown in FIG. 1, in which the stator 26b as shown in FIG. 6 is used, thus resulting in the permanent magnets being arranged asymmetrically. The use of the permanent magnets and an adapted winding design results in the rotation-speed/torque characteristic shown by the curve 24 in FIG. 3. The rotation speed of the grinding disk 50 is therefore limited to a maximum permissible circumferential velocity of, for example, 80 m/s.

Figure 2:
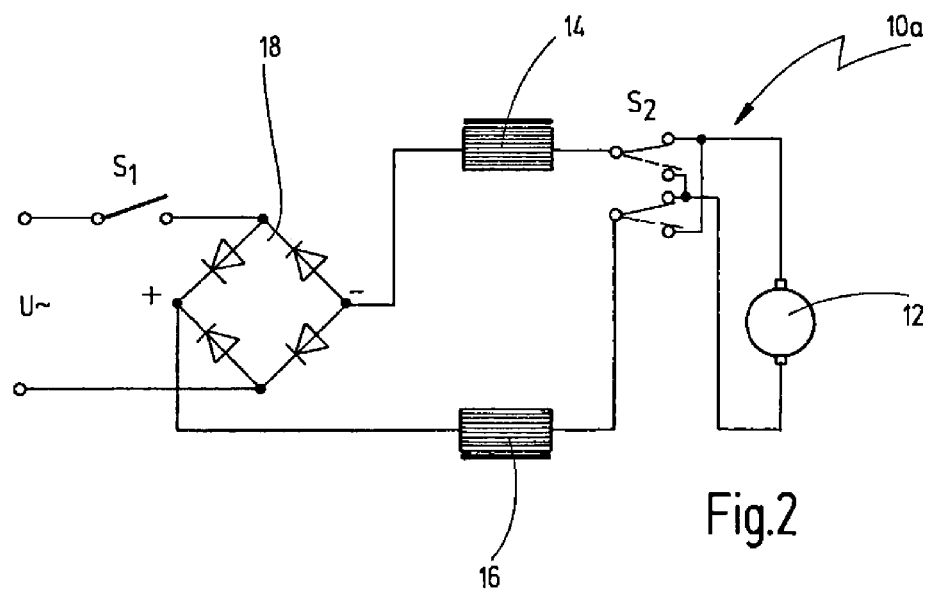
FIG. 2 shows a circuit diagram of a second embodiment of a series-wound motor according to the invention with rotation-direction reversal.

FIG. 2 shows a modified circuit of a series-wound motor according to the invention, which is annotated 10a overall. This series-wound motor 10a is designed for rotation direction reversal and therefore, for example, has a stator 26 or 26a as shown in FIG. 4 or 5. Since the field-reinforcing effect of the permanent magnets and the main field is also intended to be maintained when the rotation direction is reversed, the current direction of the armature 12 is reversed with respect to the rotation direction. By way of example, a two-pole changeover switch S2 is provided for this purpose.

What is claimed is:
1. A series-wound DC motor comprising
   a stator having a plurality of pole shoes, each pole shoe extending circumferentially into two pole horns;
   an armature;
   at least one field winding generating a main field and being connected in series with an armature winding;
   at least two permanent magnets, generating a magnetic field that is superimposed on said main field generated by said at least one field winding;
   wherein said permanent magnets are arranged asymmetrically on said pole shoes and extend at least into one of said pole horns.

2. The series-wound DC motor of claim 1, further comprising a bridge rectifier for feeding with alternating voltage.

3. The series-wound DC motor of claim 1, wherein said permanent magnets are held within slots provided on said pole shoes.

4. The series-wound DC motor of claim 1, wherein said permanent magnets are held on inner surfaces of said pole shoes.

5. The series-wound DC motor of claim 1, wherein each said permanent magnet has a field strength high enough for compensating any field weakening caused by said permanent magnet.

6. The series-wound DC motor of claim 1, wherein said permanent magnets are composed of a rare-earth material.

7. The series-wound DC motor of claim 1, wherein said pole shoes comprise slots extending in axial direction wheren said permanent magnets are received.

8. The series-wound DC motor of claim 1, having a preferred direction of rotation.

9. The series-wound DC motor of claim 1, wherein said permanent magnets extend fully over an axial length of said pole shoes.

10. The series-wound DC motor of claim 1, wherein said permanent magnets extend only partially over an axial length of said pole shoes.

11. A series-wound DC motor comprising
a stator having a plurality of pole shoes, each pole shoe extending circumferentially into two pole horns;
an armature;
at least one field winding generating a main field and being connected in series with an armature winding;
at least two permanent magnets, generating a magnetic field that is superimposed on said main field generated by said at least one field winding;
wherein said permanent magnets are arranged asymmetrically on said pole shoes and extend at least into one of said pole horns.

12. The series-wound DC motor of claim 11, wherein said pole shoes comprise slots extending in axial direction wheren said permanent magnets are received.

13. The series-wound DC motor of claim 11, wherein said permanent magnets extend fully over an axial length of said pole shoes.

14. The series-wound DC motor of claim 11, wherein said permanent magnets extend only partially over an axial length of said pole shoes.

15. The series-wound DC motor of claim 11, further comprising a bridge rectifier for feeding with alternating voltage.

16. The series-wound DC motor of claim 11, comprising at least one switch for reversing direction of rotation.

17. The series-wound DC motor of claim 11, having a preferred direction of rotation.

18. The series-wound DC motor of claim 11, wherein said permanent magnets are arranged for reinforcing said main field of said field windings.

19. A power tool comprising:
a series-wound DC motor comprising
a stator having a plurality of pole shoes, each pole shoe extending circumferentially into two pole horns;
an armature;
at least one field winding generating a main field and being connected in series with an armature winding;
at least two permanent magnets, generating a magnetic field that is superimposed on said main field generated by said at least one field winding;
wherein said series-wound DC motor is designed for having a maximum no-load rotation speed of 40 000 revolutions per minute; and,
wherein said permanent magnets are arranged asymmetrically on said pole shoes and extend at least into one of said pole horns.

20. The power tool of claim 19, which is configured as an angle grinder.

* * * * *